Jan. 15, 1924.

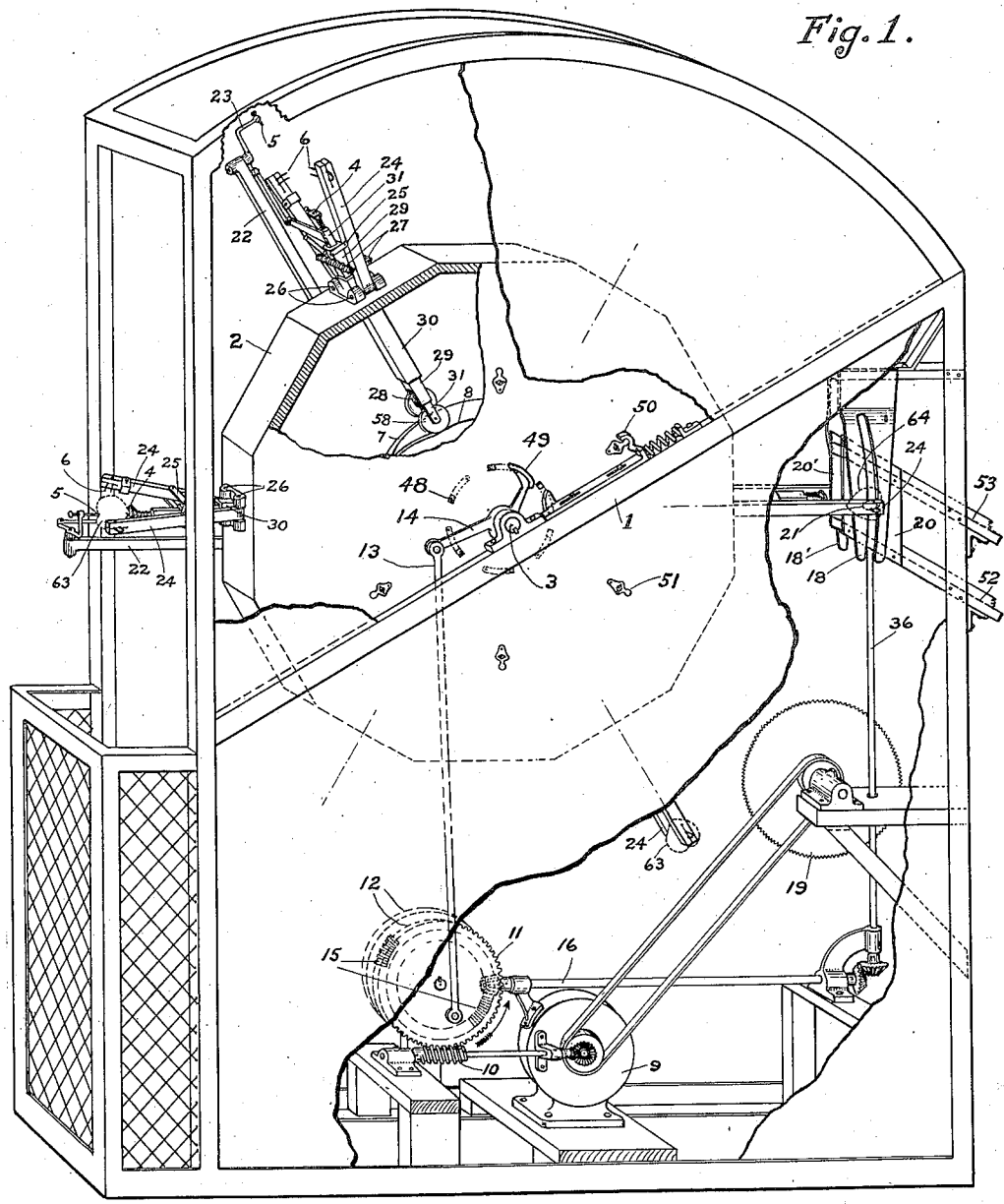

J. P. BEM ET AL 1,480,802

PEACH PITTER

Filed Dec. 26, 1922

INVENTORS
JOSEPH P. BEM.
AND JAMES K. TUTTLE.
BY
Their ATTORNEY.

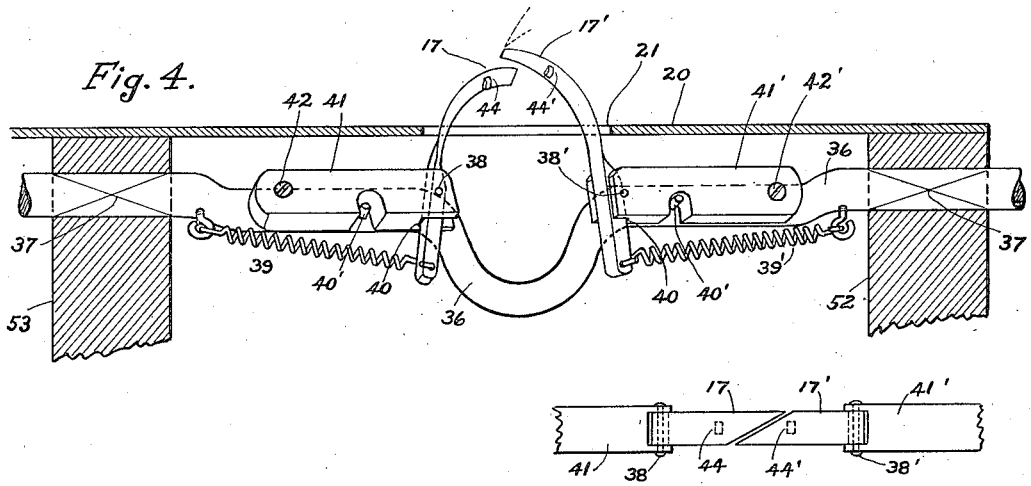
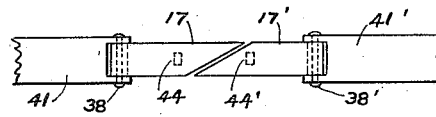
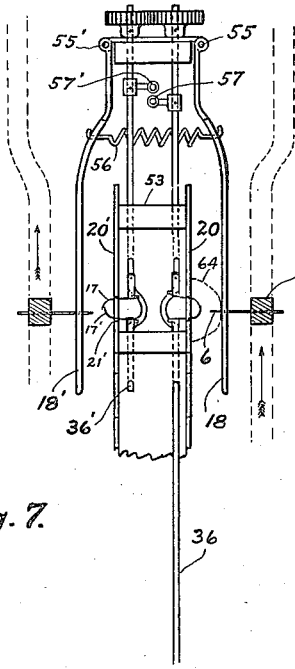
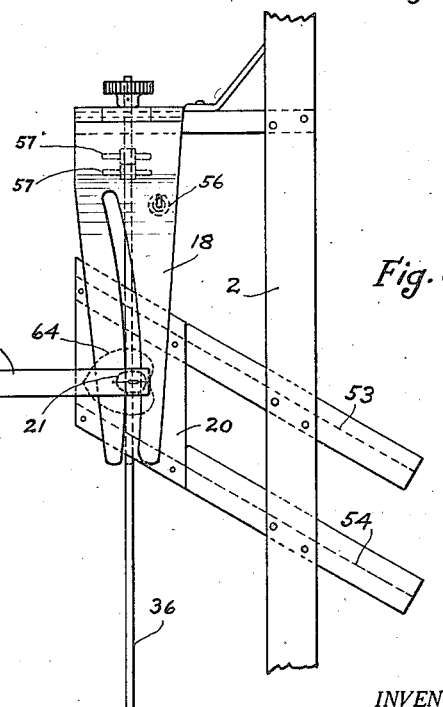

Patented Jan. 15, 1924.

1,480,802

UNITED STATES PATENT OFFICE.

JOSEPH P. BEM, OF FRESNO, AND JAMES K. TUTTLE, OF OAKLAND, CALIFORNIA, ASSIGNORS TO PACIFIC PITTING MACHINE COMPANY, INC., OF FRESNO, CALIFORNIA, A CORPORATION OF CALIFORNIA.

PEACH PITTER.

Application filed December 26, 1922. Serial No. 608,992.

*To all whom it may concern:*

Be it known that we, JOSEPH P. BEM and JAMES K. TUTTLE, citizens of the United States, residing, respectively, at Fresno, in the county of Fresno and State of California, and at Oakland, in the county of Alameda and State of California, have invented new and useful Improvements in a Peach Pitter, of which the following is a specification.

The invention relates to improvements in peach pitters as used particularly for clingstone peaches, and is of the type where the peach is received by the machine, sawed in halves through the pit, and the half pits then removed, and has for its particular objects a saving of a large percentage of fruit heretofore always cut away with the pits, together with other improvements herein enumerated.

To get a clear understanding of the improvements involved in the invention so that the drawings will be more easily understood, it should be pointed out:—that previous machines gripped and centered the fruit from the outer-sides irrespective of the pit within the fruit, then sawed the fruit in halves, which may or may not have come anywhere near the center of the pit. Then with a curved knife cutting a definite curved swath through the half peaches, the half pits were removed.

It will be seen that the path of the knife had to be large enough to cut around the largest pit to be encountered, and since there is a great difference between the size of the largest and smallest pits in different size peaches, the waste meat left on a day's run of many thousands of varying size peaches was considerable.

Also, since it is highly desirable that the pits be sawed through their centers for uniform pitting, and since the pits of peaches are not in the geometrical center of the fruit, but usually out of center even to the extent of a half inch or so, it follows that a device holding and centering peaches from the outer sides cannot present them to the saw in proper position to be halved through the center of the pit.

Our machine herein described overcomes these defects by centering the peaches with relation to the position of the pits and not from the outer sides, and then it cuts out the half pits of the bisected peach with yielding knives which conform to the varying shape of a pit or the varying sizes of pits, thus reducing the loss of material left on the pits to a minimum.

In presenting the peaches to our machine at the receiving end, certain physical characteristics are observed. First, a peach has a depression at the stem end, secondly, a point at the bloom end, and thirdly, a ridge and groove at opposite sides. The stem depression and bloom end point are in line with the center of the pit, and receiving devices on our machine approximately centers the peach from these points, the ridge is turned in line with the plane of the saw by the operator, after which the flesh of the peach is automatically pierced by pins which impinge opposite sides of the pit, clamping and centering the peach relative to the pit, in which position it is carried to the saw.

Just before sawing the peach in half the end centering devices are removed to clear a path for the saw.

In the drawings accompanying this specification, Figure 1 shows in perspective, a general view of our peach-pitter with a peach dotted in position at both the receiving and pitting positions. A portion of the machine outer casing is shown broken away to reveal the position of the controlling cams, saw, motor, etc.

Figure 4 is a perspective view of one set of the rotary, curved and yieldably mounted pitting knives, drawn approximately full size.

Figure 5 shows a modification of the overlapping blade ends of the knives.

Figure 6 is an enlarged view of the pitting table arrangement. Figure 7 is an end view of the construction shown in Fig. 6.

Figures 2, 3:
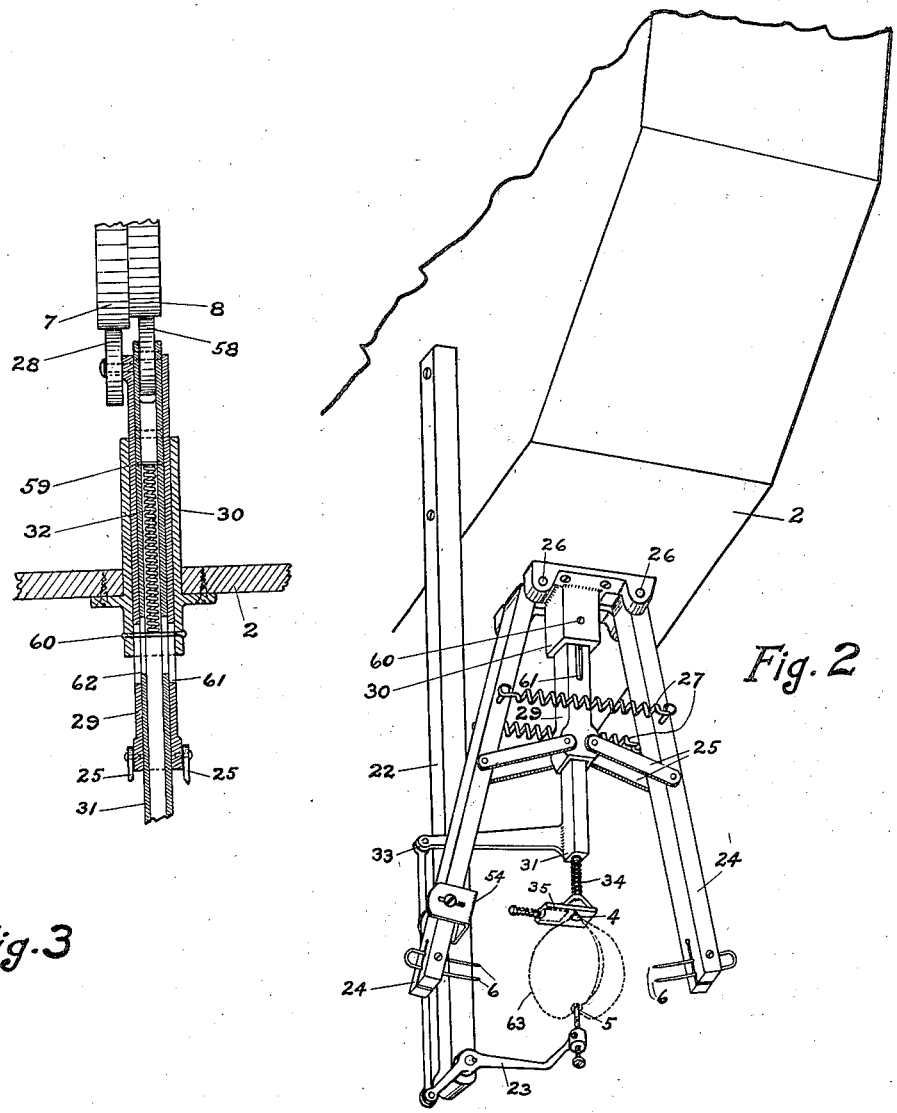
Figure 2 is an enlarged perspective view of the fruit receiving devices with a peach dotted in position, and the pivoted, pit centering arms. The view is taken as the members would appear to an operator looking down.
Figure 3 is a sectional detail of the inner ends of the sliding square pipes which move the arms and receiving devices, and shows the cam wheels, cams, etc.

In further detail, the drawings show, in Figure 1 a frame 1 supporting a revoluble drum or carrier 2 revoluble around a stationary shaft 3. The drum carries several sets of receiving and clamping devices projecting from its periphery, only two of which sets are shown complete as being sufficienly illustrative.

The receiving devices are numbered 4 and 5, and the clamping, peach penetrating devices 6, 6.

At the receiving position, and just preceding the bisecting device 19 a whole peach 63 is shown dotted in place, and at the pitting position the bisected peach is dotted in place at 64.

At 7 and 8 inside the drum are indicated the two faces of a double, stationary, circular cam. This cam is co-axial with the drum, is fixed to the fixed shaft 3, and controls the movements of the receiving devices and clamping arms at various points in the revolution of the drum.

At 9 is a motor geared by means of a worm 10 to a wormwheel 11 formed on the edge on one of a pair of crank disks 12. A connecting rod 13 extends from the disk to a ratchet arm 14 and serves through rotation of the disk to intermittently rotate the drum to advance one set of receiving and clamping arms to the position of the set in advance.

The ratchet arm 14 is loose on the stationary shaft and engages the snap catches 48 on the drum, and also, by means of a cam 49 on the arm, releases a drum locking device 50 on the frame of the machine and which co-operates with suitable locking members 51 on the drum. These locking members are adjustable for accurately locating the position of the peach over the pitting tables at each stop.

The double crank disks are also geared through means of an intermittent gear 15 on each, to a drive shaft 16 to operate the curved pitting knives 17 (not shown in this view) and also the peach clamping plates 18, shown more clearly in Figures 6 and 7.

At 19 is shown a bisecting device, either a toothed or plain edged high speed circular saw, belted to the motor as shown, and which serves to divide the fruit in halves when carried past it while held in the clamps.

At 20 is a pair of pitting tables upon which the bisected fruit is automatically laid by the arms 24 and clamped by the plates 18. These pitting tables 20 each have an opening 21 through which the pit cutting out knives operate. The tables are supported on slanted extensions 52, 53, from the frame, the extensions providing bearing supports for the pitting knife shaft 36, and also form chutes for discharging the pits and fruit, the lower one 52 receiving the pits, and the upper one 53 the pitted fruit.

In Figure 2 is shown an enlarged view of the fruit receiving and holding devices, a rigid post 22 is secured to the side of the drum 2 and spaced laterally far enough to clear the saw and pitting tables during the revolution of the drum. The post 22, carries a crooked lever 23 terminating in a blunt, screw-adjusting pin 5 adapted to locate the stem depression of the fruit. At 4 is shown a small ring shaped seat for receiving the point of a peach at the bloom end. This seat is resiliently mounted so that a peach may first have its point there inserted, the seat depressed and the stem depression of the peach brought over the receiving locating pin 5, then released so that the peach is centrally held between them. The operator then gives the peach a twist if necessary to insure the ridge of the peach being uppermost and in line with the path of the saw.

The pin clamping devices 6 are carried by the pivoted clamping arms 24 which latter are linked to co-operate toward a common center by the links 25. The clamping arms are pivoted to the drum at 26 on short shafts and are actuated by powerful springs 27 so as to enter the flesh of the peach and impinge the pit from both sides when permitted to do so by the controlling cam face 7 bearing on a cam-wheel 28 carried by a sliding square pipe 29 connected to the other ends of the links 25. This pipe has bearing support in a stationary outer pipe 30 fixed to the drum, and is adapted to slide up and down therein.

Within the pipe 29 is another sliding member 31 with a cam-wheel 58 on its inner end bearing on the other controlling cam surface 8. This sliding member 31 is forced against the controlling cam by a coiled spring 32 within it (shown in Figure 3). It carries at its outer end the seat 4 for the bloom end of the peach and is connected over at 33 to actuate the stem end locating device 5 so that in the travel of the drum, after the clamping pins 6 have entered the peach, the form of the cam 8 permits the bloom receiving end to withdraw to clear the saw, and also swings the stem locating pin and lever out of the way of the saw and pitting tables.

It should be noted that the bloom receiving end or seat is resiliently mounted on a sliding rod actuated by the small spring 34 and has limited movement to permit of receiving all sizes of peaches. Also co-operating with this seat is a spring returned tip cutting knife 35 which is actuated by one of the clamping arms through striking of the plate 54, and serves to cut off the very tip of the peach, an operation always heretofore carried out by hand in order to complete pitted half peaches for canning.

It might be mentioned here that as soon as the clamping pins have pierced the flesh of the fruit the end locating or receiving devices are no longer necessary as the clamps co-operate toward a common center and the peach cannot shift therein.

In Figure 3, a cross section of the inner ends of the sliding square pipes, the position of the cam wheels, etc., is made clear. The inner sliding member 31 is forced inward against the cam face 8 by the concealed coiled spring 32 working against a pin 59 fixed in the member 31 and reacting against a pin 60 fixed in the stationary guide pipe 30, both pipes 29 and 31 being slotted, respectively, as indicated at 61, and 62, in order to slide over it.

In Figure 4 the operation of the curved pitting knives will be discerned. Instead of one solid curved knife or spoon as heretofore used, we have two segments 17, 17', in practice two sets being employed, mounted on separate shafts geared together to cut around the half pits of the two half peaches on the two pitting tables simultaneously. (The two tables being shown in Figure 7 where they are numbered 20, 20').

The curved blade segments 17, 17' operate through a hole 21 in the table 20 and are carried on an offset shaft 36 mounted in suitable bearings 37 in extensions 52, 53 of the frame of the machine, and each segment is respectively pivoted to a carrier at 38, 38', and the blades are adapted to swing apart as denoted by the dotted lines, the springs 39, 39' serving to return them to the normal position determined by the stops 40, 40'. The carriers are numbered 41, 41', and are themselves pivoted to the shaft at 42, 42' to swing outwardly, and are returned by the same springs 39, 39' which return the blades. Thus it will be seen that the blades can move both outwardly and also away from one another and thereby conform to any shape of half pit which they may encounter.

The blades are pulled against the pit by the springs, traveling around it when the knife shaft is given a half turn. The blades are also each provided with a small shoe or guard 44, 44' which rides on the pit and maintains a constant clearance between the blades and the pit, thus reducing to the minimum the fruit wastage yet protect the blades against striking the pit.

The adjustment of the machine is such, that through the office of the stem locating pin 5 the half peaches come to rest on the pitting tables in position for the knife blades to enter the peach just beyond the point where the pin was formerly in contact, so as to just clear the pit in entering. The screw adjustment of the stem end locating device makes it easy to secure this condition.

The blades will be observed to be set one in advance of the other, this is for the purpose of allowing them to overlap the center of the pit in starting to cut, so that in opening for a large pit they will not leave an uncut portion. This same condition may be secured without having the blades in staggered relation, by beveling the ends off as indicated in Figure 5, but is not so strong.

In Figures 6 and 7 the relation of the clamping plates 18, 18' to the peach and pitting tables is better shown. Figure 6 is an enlarged side view of the pitting arrangement with the parts already described numbered as given. Figure 7 is an end view of the arrangement and shows the clamping plates 18, 18' pivoted at 55 to an extension from the frame, a spring 56 connected to opposite sets of clamping plates serving to pull them together and force the half peaches against the tables 20, 20', one peach half being shown dotted in place at 64.

At 57, 57', are shown short arms on the knife shafts for raising the clamping plates at each end of the knife stroke.

The peach halves in entering the pitting device do not drag over the tables under pressure to cause injury in passing over the knife openings therein, but are clamped against the tables after being located thereon.

*Operation of the machine.*—After the peach has been placed in the receiving devices centralized from the bloom and stem ends, the drum advances toward the next position and the controlling cam 7 within the drum permits the spring actuated clamping arms 6 to approach the fruit and the pins to penetrate, a further movement of the arms operates the tip cutting knife 35 and severs the tip from the bloom end, a further revolution of the drum releases the receiving devices to clear the saw and pitting mechanism, a still further rotation passes the pin penetrated and pit clamped peach past the saw, dividing the peach, after which the arms are separated by the cam and carry the halves of the peach with them impaled on the pins. They now pass over the pitting tables 20, 20' and under the raised clamping plates 18, 18' with the half peaches clearing the pitting tables, and when directly over the holes in the tables the movement of the drum ceases and it is locked in this position by the drum lock 50.

The intermittent gears on the crank discs now operate the knife shafts, the latter first releasing the spring actuated clamping plates, which thereupon force the peach halves off of the impaling pins somewhat and tight against the pitting tables.

Then the knives swing through the peach halves cutting out the pits which pass through the offsets of the shafts and drop to the lower slide 52 and thence from the machine. At the end of the stroke the knife shaft arms again separate the clamping plates. The drum advances bringing a fresh peach to the saw, and carrying the pitted halves above the pitting table where they are stripped from the pins and drop to the upper slide 53 and out of the machine.

The controlling cam 7 now allows the clamping arms 24 to separate as far as they go, the other controlling cam 8 now returns the receiving devices to receiving position as shown in Figure 2. After the pitted halves drop from the machine the intermittent gear returns the knife shafts to the starting point.

When the words "half" or "bisected" peach are used in the specification and claims, relative to the product of our machine we do not necessarily mean equal halves, but a peach divided approximately through the pit center. Also, though we show and prefer a machine with intermittent motion locked during the pitting period, it is obvious that the machine could be made to operate continuously while using most of the improvements embraced in our invention, and the exclusive use of which we feel entitled to in any similar type of machine for peaches or similar fruit.

We claim:—

1. In a machine of the class described, a device for pitting a bisected peach comprising a revoluble shaft, a knife blade mounted at one end to said shaft, the other end projecting from the shaft and being curved to follow a path about the half pit of the bisected peach upon the operation of the shaft, and means for yieldably forcing the blade toward the pit.

2. In a peach pitter for pitting bisected peaches, a shaft with an offset, two curved blades pivotally attached to the shaft with their ends overhanging the offset.

3. In a machine of the class described, means for holding a peach, means for bisecting the peach and pit whilst held, a device for pitting the bisected peach comprising a revoluble shaft, a knife blade mounted at one end to said shaft, the other end projecting from the shaft and being curved to follow a path about the half pit of the bisected peach upon operation of the shaft, and means for yieldably holding the blade against the pit.

4. In a machine for pitting bisected peaches, a revoluble shaft, two curved blades mounted at their shanks to said shaft with their cutting portions arching toward one another.

5. In a machine for pitting bisected peaches, a revoluble shaft, two curved blades mounted at their shanks to said shaft with their cutting portions arched toward one another with their ends overlapping.

6. In a machine for pitting bisected peaches, a revoluble shaft, two curved blades mounted at their shanks to said shaft with their cutting portions arched toward one another, said blades being set one in advance of the other with respect to shaft rotation.

7. In a machine for pitting bisected peaches, a revoluble shaft, two curved blades mounted at their shanks to said shaft with their cutting portions arched toward one another with their ends overlapping the center of the arch, said blades being set one in advance of the other with respect to the shaft rotation.

8. In a machine for pitting bisected peaches, a revoluble shaft, two curved blades mounted at their shanks to said shaft with their cutting portions arching toward one another, and means for yieldably forcing the cutting portions of the blades toward one another.

9. In a machine for pitting bisected peaches, a revoluble shaft, two curved blades mounted at their shanks to said shaft with their cutting portions arching toward one another, said blades being set one in advance of the other with respect to shaft rotation, and means for yieldably forcing said blades toward the arch which they enclose.

10. In a peach pitter of the class described embracing means for holding a peach and means for bisecting said peach, curved blades mounted to travel in an arc and each adapted to cut around a portion of the half pit of the bisected peach, said blades having ends overlapping the central portion of the pit.

11. In a peach pitter of the class described, receiving devices for holding the fruit centralized from the bloom and stem ends, co-operating devices adapted to penetrate the flesh of the fruit and impinge opposite sides of the pit to center the fruit thereto.

12. In a peach pitter of the class described, means for locating the bloom tip of a peach, devices for clamping the peach, a cutter arranged for cutting off the tip of the peach, and means for co-operatively actuating said devices and said cutter.

13. In a peach pitter of the class described, a bisecting device, means for centering a peach from the bloom and stem ends relative to said bisecting device, and means for penetrating the flesh of the peach and carrying it into engagement with said bisecting device.

14. In a fruit pitter of the class described, a pitting knife having a curved blade for cutting around a fruit pit, a spacing guard on the inner side of said blade for holding the blade spaced from the pit.

15. In a peach pitter of the class described, a revoluble carrier, peach receiving and peach penetrating devices on said carrier, means for clamping said penetrating devices on a peach held in said receiving devices, means for removing said receiving devices, a peach bisecting device, means for passing the thus clamped peach into engagement with the bisecting device, means for separating said penetrating devices with the half peaches impaled thereon, spaced pitting tables with openings therethrough, curved pitting knives adapted to rotate in said openings, means for locating the bisected peach on said tables over said openings, means for actuating said knives to cut out the pits of the halves, and means for removing the halves from said penetrating devices.

16. In a peach pitter of the class described, a frame, a revoluble carrier mounted thereon, movable devices projecting from said carrier for receiving and for clamping peaches, a stationary cam co-axial within said carrier adapted to operate successively said receiving and said clamping devices upon the rotation of said carrier.

17. In a peach pitter of the class described embracing a peach bisecting device, a pair of spaced pitting tables, curved knives operating therethrough for cutting out the pits, means for bringing the peach halves in pitting position over said tables without pressure against said tables, means for then clamping said peach halves against said tables and means for operating said knives.

18. In a peach pitter of the class described, peach receiving devices adapted to centralize the peach from the bloom and stem ends, a knife located on the bloom end receiving device adapted for cutting off the tip of the peach, a pair of clamps for clamping the peach, and means for actuating said clamps and said knife.

19. In a peach pitter of the class described, a revoluble carrier, a stationary cam within said carrier and co-axial therewith, peach receiving devices on arms projecting from said carrier, peach clamping devices on projecting arms pivoted to said carrier, springs for actuating said devices, means to insure the co-operation of said clamping devices toward and from a common center, and means controlled by the cam for operating the devices upon the revolution of the carrier.

20. In a peach pitter of the class described, a peach bisecting device, curved pitting knives, a peach locating device operative against the stem end of the peach, clamps for retaining the peach in a position thus located, means for passing the peach through engagement with the bisecting device, and means for presenting the peach halves to the pitting knives for a point of entry just outside of the located point.

21. In a peach pitter of the class described, peach receiving devices embracing a resiliently mounted socket adapted to receive the bloom end of a peach, and a locating device co-operating therewith adapted to impinge against the stem end of the peach.

22. In a peach pitter of the class described, a frame, a revoluble carrier supported by said frame, means for imparting intermittent rotary motion to said carrier, a plurality of fruit receiving and holding devices on said carrier, a saw on said frame adapted to saw the fruit in halves during the rotation of said carrier, a pitting device supported by the frame adapted to pit the halved fruit during the quiescent periods of the carrier, and a positive locking device adapted to lock the carrier in definite positions during said quiescent periods for alining the fruit holding devices with respect to the pitting device.

23. In a machine of the class described, a frame, a carrier supported by said frame, a plurality of fruit holding devices on said carrier, means for imparting an intermittent rotary motion to said carrier, means for bisecting fruit held in said devices during motion of the carrier, pitting mechanism for pitting the bisected fruit during the quiescent periods of said carrier, a plurality of locking devices for locking said carrier during its quiescent periods for alining the holding devices successively with said pitting mechanism, and means for separately adjusting said locking devices to predetermine the locked relation of said devices with respect to said pitting mechanism.

24. In a fruit pitter of the class described, a revoluble shaft, a curved blade pivotally secured thereto and projecting therefrom, means for turning the shaft to swing the blade in an arcuate path for cutting around a fruit pit, means for yieldably forcing the blade toward the pit, a spacing guard on the inner side of said blade adapted to ride on the pit and hold the blade spaced therefrom.

25. In a peach pitter of the class described, devices for centering a peach from opposite points at the bloom and stem ends, means for then clamping the peach thus centered, means for withdrawing the centering devices, and a cutter arranged to bisect the peach thus clamped in a plane passing through the said points.

26. In a machine for pitting bisected peaches, a revoluble shaft, a carrier pivotally mounted at one end to said shaft, a curved blade pivotally mounted at the other end of the carrier, stopping means to limit the inward motion of said carrier and blade, and resilient means for urging said carrier and blade toward said stopping means.

27. In a machine for pitting bisected peaches, a shaft, two spaced carriers pivotally mounted at their remote ends to said shaft, two curved blades each pivotally secured respectively, to a near end of a carrier, stops to limit the movement of said carriers and blades, and resilient means for urging said carriers and blades toward said stops.

28. In a machine for pitting bisected peaches, a shaft with an offset, two carriers lying on the shaft near the offset and pivoted at their remote ends to the shaft, two curved blades pivoted, each respectively, to one of the carriers at a near end thereof, said blades being formed to arch toward one another over the offset.

JOSEPH P. BEM.
JAMES K. TUTTLE.